United States Patent
Kim et al.

(10) Patent No.: US 11,905,354 B2
(45) Date of Patent: Feb. 20, 2024

(54) METHOD OF PREPARING ACRYLONITRILE-BASED COPOLYMER FOR CARBON FIBER

(71) Applicant: LG CHEM, LTD., Seoul (KR)

(72) Inventors: Jong Gil Kim, Daejeon (KR); Chang Hun Kim, Daejeon (KR); Jeong Hun Cho, Daejeon (KR); Hyun Min Cho, Daejeon (KR); Joon Hee Cho, Daejeon (KR); Hyo Yong Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 473 days.

(21) Appl. No.: 17/266,078

(22) PCT Filed: Nov. 1, 2019

(86) PCT No.: PCT/KR2019/014725
§ 371 (c)(1),
(2) Date: Feb. 4, 2021

(87) PCT Pub. No.: WO2020/091511
PCT Pub. Date: May 7, 2020

(65) Prior Publication Data
US 2021/0301051 A1 Sep. 30, 2021

(30) Foreign Application Priority Data
Nov. 2, 2018 (KR) .................. 10-2018-0133737

(51) Int. Cl.
*C08F 220/46* (2006.01)
*C01B 32/05* (2017.01)
*D01F 9/22* (2006.01)

(52) U.S. Cl.
CPC ............ *C08F 220/46* (2013.01); *C01B 32/05* (2017.08); *D01F 9/22* (2013.01); *C08F 2800/10* (2013.01)

(58) Field of Classification Search
CPC .......................... C08F 220/46; C08F 220/40
See application file for complete search history.

(56) References Cited

U.S. PATENT DOCUMENTS

| | | | |
|---|---|---|---|
| 2,913,438 A | 11/1959 | Davis et al. | |
| 4,130,525 A * | 12/1978 | Kobashi | D06M 15/31 524/869 |
| 4,237,109 A | 12/1980 | Hiramatsu et al. | |
| 4,397,831 A * | 8/1983 | Saito | D01F 9/32 423/447.5 |
| 4,513,126 A | 4/1985 | Yamazaki et al. | |
| 6,326,451 B1 | 12/2001 | Hamada et al. | |
| 2002/0041957 A1 | 4/2002 | Ikeda et al. | |
| 2003/0064221 A1 | 4/2003 | Ikeda et al. | |
| 2015/0174807 A1 | 6/2015 | Tang et al. | |
| 2018/0207849 A1 | 7/2018 | Tang et al. | |
| 2019/0153211 A1 | 5/2019 | Tang et al. | |
| 2021/0230330 A1 * | 7/2021 | Kim | D01F 9/22 |
| 2021/0403624 A1 * | 12/2021 | Moskowitz | D01D 5/06 |

FOREIGN PATENT DOCUMENTS

| | | | | |
|---|---|---|---|---|
| CN | 1516710 A | * | 7/2004 | ............ C08F 220/46 |
| CN | 104558394 A | | 4/2015 | |
| CN | 104562222 A | * | 4/2015 | ............... D01D 1/02 |
| EP | 3875505 A1 | | 8/2021 | |
| JP | 48-061730 A | | 8/1973 | |
| JP | S48-38344 B1 | | 11/1973 | |
| JP | S49-87825 A | | 8/1974 | |
| JP | 53-123453 A | * | 10/1978 | .............. C08L 33/20 |
| JP | S53-123453 A | | 10/1978 | |
| JP | S58-091712 A | | 5/1983 | |
| JP | 04-119127 A | | 4/1992 | |
| JP | 2002-266159 A | | 9/2002 | |
| JP | 2004-027396 A | | 1/2004 | |
| JP | 2011-0213771 A | | 10/2011 | |
| JP | 2012-25837 A | | 2/2012 | |
| JP | 2017-503066 A | | 1/2017 | |
| KR | 10-0473126 | | 3/2005 | |
| KR | 10-0364655 | | 12/2012 | |

OTHER PUBLICATIONS

CN 104562222 A (Apr. 29, 2015); machine translation. (Year: 2015).*
JP 53-123453 A (Oct. 27, 1978); machine translation. (Year: 1978).*
CN 1516710 A (Jul. 28, 2004); machine translation. (Year: 2004).*
International Search Report from PCT/KR2019/014725, dated Feb. 11, 2020.
Written Opinion of the ISA from PCT/KR2019/014725, dated Feb. 11, 2020.
Office Action of Japanese Patent Office in Appl'n 2021521387, dated May 10, 2022.
Chung, et al. (1994).Carbon Fiber Composites.Butterworth-Heinemann. pp. 1-213.

* cited by examiner

*Primary Examiner* — Rip A Lee
(74) *Attorney, Agent, or Firm* — BRYAN CAVE LEIGHTON PAISNER LLP

(57) ABSTRACT

Provided is a method of preparing an acrylonitrile-based copolymer for a carbon fiber, which comprises: preparing a reaction solution including a monomer mixture comprising a sulfonate-based monomer represented by Chemical Formula 1, a carboxylic acid-based monomer, and an acrylonitrile-based monomer and an organic solvent; and subjecting the reaction solution to polymerization, wherein the monomer mixture comprises the sulfonate-based monomer represented by Chemical Formula 1 at 0.55 to 1.6 mol %.

10 Claims, No Drawings

METHOD OF PREPARING ACRYLONITRILE-BASED COPOLYMER FOR CARBON FIBER

The present application is a National Phase entry pursuant to 35 U.S.C. § 371 of International Application No. PCT/KR2019/014725 filed on Nov. 1, 2019 and claims priority to and the benefit of Korean Patent Application No. 10-2018-0133737, filed on Nov. 2, 2018, the disclosures of which are incorporated herein by reference in its entirety.

FIELD

The present invention relates to a method of preparing an acrylonitrile-based copolymer for a carbon fiber, and specifically, to a method of preparing an acrylonitrile-based copolymer for a carbon fiber which is more suitable for a spinning process.

BACKGROUND

Carbon fibers are fibrous carbon materials that are composed of carbon atoms at 90 wt % or more of the total weight and mean fibers obtained by pyrolyzing, in an inert atmosphere, an acrylonitrile-based copolymer and a fiber-shaped precursor made from pitch or rayon which is a petroleum- or coal-based hydrocarbon residue.

Carbon fibers are materials having both the structural and textural characteristics of carbon and a fiber shape and are excellent in heat resistance, chemical stability, electrical and thermal conductivity, dimensional stability according to low-temperature expandability, low density, friction/wear properties, X-ray transmittance, electromagnetic shielding, biocompatibility, flexibility, and the like. In addition, carbon fibers may be provided with outstanding adsorbability according to an activation condition.

The acrylonitrile-based copolymer is being widely used as a raw material of a carbon fiber precursor. As a method of preparing the acrylonitrile-based copolymer, solution polymerization is commonly used. Solution polymerization is a method using a monomer, an initiator, and a reaction solvent and has an advantage in which, since a copolymer solution itself can be used as a spinning solution, a process of dissolving a copolymer in a spinning solvent is not required.

Meanwhile, since the mechanical properties of the carbon fiber are affected by the morphology of an acrylonitrile-based copolymer fiber which is a precursor, the morphology of an acrylonitrile-based copolymer fiber needs to be adjusted from a spinning process. In particular, when an acrylonitrile-based copolymer fiber is manufactured by wet spinning, a coagulation rate of an acrylonitrile-based copolymer is known to greatly affect the morphology of a fiber. Accordingly, ammonia was conventionally added to an acrylonitrile-based copolymer solution to adjust the coagulation rate of an acrylonitrile-based copolymer. However, an ammonia addition process was additionally required, and additional safety management equipment for ammonia, which is a toxic gas, needed to be installed, causing manufacturing costs to be increased.

Therefore, there is a demand for the development of an acrylonitrile-based copolymer that can be manufactured as an acrylonitrile-based copolymer fiber for a carbon fiber with excellent morphology by wet spinning without separate ammonia treatment.

SUMMARY

The present invention is directed to providing an acrylonitrile-based copolymer for a carbon fiber which is capable of realizing a weight-average molecular weight and a viscosity suitable for a spinning process.

The present invention is also directed to providing a method of preparing an acrylonitrile-based copolymer for a carbon fiber which exhibits excellent circularity without separately carrying out a hydrophilization process.

The present invention is also directed to providing a method of preparing an acrylonitrile-based copolymer for a carbon fiber which exhibits excellent spinnability and minimized side reactions during a fireproofing process.

One aspect of the present invention provides a method of preparing an acrylonitrile-based copolymer for a carbon fiber, which comprises: preparing a reaction solution including a monomer mixture comprising a sulfonate-based monomer represented by Chemical Formula 1, a carboxylic acid-based monomer, an acrylonitrile-based monomer and an organic solvent; and subjecting the reaction solution to polymerization, wherein the monomer mixture includes the sulfonate-based monomer represented by Chemical Formula 1 at 0.55 to 1.6 mol %:

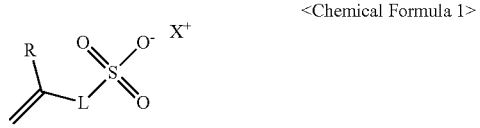

<Chemical Formula 1>

In Chemical Formula 1,
R is hydrogen or a $C_1$ to $C_3$ linear alkyl group,
L is a $C_1$ to $C_3$ linear alkylene group, and
X is an alkali metal.

According to a method of preparing an acrylonitrile-based copolymer for a carbon fiber of the present invention, an acrylonitrile-based copolymer which is capable of realizing a weight-average molecular weight and a viscosity suitable for a spinning process, can be prepared. In addition, an acrylonitrile-based copolymer fiber, which exhibits excellent circularity without separately carrying out a hydrophilization process, can be manufactured. Additionally, an acrylonitrile-based copolymer for a carbon fiber, which exhibits excellent spinnability and minimized side reactions during a fireproofing process, can be prepared.

DETAILED DESCRIPTION

Hereinafter, the present invention will be described in more detail to facilitate understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the $C_1$ to $C_3$ linear alkyl group may be a $C_1$ to $C_3$ straight-chain or branched-chain alkyl group. The $C_1$ to $C_3$ linear alkyl group may be one or more selected from the group consisting of a methyl group, an ethyl group, a propyl group, and an isopropyl group and is preferably a methyl group.

In the present invention, the $C_1$ to $C_3$ linear alkylene group may be a $C_1$ to $C_3$ straight-chain or branched-chain alkylene group. The $C_1$ to $C_3$ linear alkylene group may mean that the $C_1$ to $C_3$ linear alkyl group has two binding sites (i.e., a divalent alkyl group).

In the present invention, an alkali metal may be one or more selected from the group consisting of lithium, sodium, potassium, rubidium, cesium, and francium and is preferably sodium.

1. Method of Preparing Acrylonitrile-Based Copolymer for Carbon Fiber

A method of preparing an acrylonitrile-based copolymer for a carbon fiber according to an embodiment of the present invention includes the steps of: 1) preparing a reaction solution including a monomer mixture comprising a sulfonate-based monomer represented by Chemical Formula 1, a carboxylic acid-based monomer, an acrylonitrile-based monomer and an organic solvent; and 2) subjecting the reaction solution to polymerization, wherein the monomer mixture includes the sulfonate-based monomer represented by Chemical Formula 1 at 0.55 to 1.6 mol %:

<Chemical Formula 1>

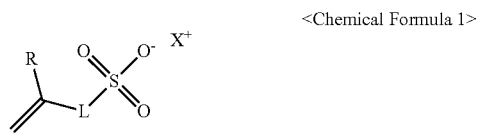

In Chemical Formula 1,

R is hydrogen or a $C_1$ to $C_3$ linear alkyl group,

L is a $C_1$ to $C_3$ linear alkylene group, and

X is an alkali metal.

Hereinafter, each step of the method of preparing an acrylonitrile-based copolymer for a carbon fiber according to an embodiment of the present invention will be described in detail.

Step 1): Preparation of Reaction Solution

First, a reaction solution including a monomer mixture and an organic solvent is prepared.

The monomer mixture includes a sulfonate-based monomer represented by Chemical Formula 1, a carboxylic acid-based monomer, and an acrylonitrile-based monomer.

Since L of the sulfonate-based monomer represented by Chemical Formula 1 is an alkylene group, the sulfonate-based monomer represented by Chemical Formula 1 has superior price competitiveness to a sulfonate-based monomer, wherein L is an arylene group or the like, causing manufacturing costs to be reduced.

Since X of the sulfonate-based monomer represented by Chemical Formula 1 is an alkali metal, a polymer may be hydrophilized without separately carrying out an additional reaction, and accordingly, the manufacture of an acrylonitrile-based fiber by wet spinning may be facilitated. However, when X is ammonium, an ion exchange process needs to be additionally carried out after the manufacture of an acrylonitrile-based copolymer, and as a result, process costs may be increased to degrade manufacturing efficiency. In addition, when X is hydrogen, hydrophilicity is not imparted to an acrylonitrile-based copolymer, and therefore, a process for imparting hydrophilicity needs to be additionally carried out, which is inappropriate.

The sulfonate-based monomer represented by Chemical Formula 1 may be selected from the group consisting of sodium methallyl sulfonate and sodium allyl sulfonate and is preferably sodium methallyl sulfonate which can impart hydrophilicity to an acrylonitrile-based copolymer.

The sulfonate-based monomer may be included at 0.55 to 1.6 mol %, preferably 0.6 to 1.5 mol %, and more preferably 0.6 to 1.2 mol %, with respect to the total molar amount of the monomer mixture. When the above-described condition is satisfied, a spinning solution including the acrylonitrile-based copolymer for a carbon fiber has an appropriate viscosity, and thus spinnability can be excellent. In addition, an acrylonitrile-based copolymer for a carbon fiber can be manufactured as a fiber which exhibits excellent circularity without separately carrying out a hydrophilization process. Additionally, a fireproofing process can be carried out at an appropriate temperature, and thus manufacturing efficiency can be enhanced. Amounts below the above-described range, the viscosity of a spinning solution including an acrylonitrile-based copolymer for a carbon fiber is increased, and thus spinnability may be degraded. In addition, a fiber which exhibits excellent circularity may not be manufactured. Amounts above the above-described range, a fiber may not be coagulated but swelled in a coagulation solution during a coagulation process. In addition, a fiber may be manufactured with a skin-core structure in which only the surface of coagulated yarn manufactured by a coagulation process is coagulated and the inside thereof is not coagulated. Additionally, side reactions occur in addition to cyclization during a fireproofing process, and thus the material properties of carbon fiber which is a final product may be degraded.

The carboxylic acid-based monomer may be one or more selected from the group consisting of acrylic acid, methacrylic acid, ethacrylic acid, itaconic acid, crotonic acid, citraconic acid, maleic acid, and mesaconic acid. The carboxylic acid-based monomer may preferably be itaconic acid.

The carboxylic acid-based monomer may be included at 0.5 to 1.5 mol %, preferably, 0.7 to 1.3 mol %, with respect to the total molar amount of the monomer mixture. When the above-described range is satisfied, a fireproofing initiation temperature can be lowered, and side reactions can be prevented from occurring while improving energy efficiency during a fireproofing process.

The acrylonitrile-based monomer may be one or more selected from the group consisting of acrylonitrile, methacrylonitrile, and ethacrylonitrile. The acrylonitrile-based monomer may preferably be acrylonitrile.

The acrylonitrile-based monomer may be included as the remainder so that the total molar amount of the monomer mixture is 100 mol %.

The organic solvent, which is a reaction solvent, is favorable for increasing the weight-average molecular weight and concentration of a copolymer in a polymerization process, as compared to an inorganic solvent. In addition, when an appropriate amount of the organic solvent is added, a copolymer solution after the polymerization can be directly used in a spinning process, and thus the process steps can be reduced, which can ultimately contribute to an enhancement in productivity of a precursor fiber.

The organic solvent may be one or more selected from the group consisting of dimethyl sulfoxide, dimethyl formamide, and dimethyl acetamide and is preferably dimethyl sulfoxide.

The organic solvent may be included in an amount of 200 to 500 parts by weight, 250 to 400 parts by weight, 300 to 350 parts by weight, or 300 to 330 parts by weight with respect to 100 parts by weight of the monomer mixture and is preferably included in an amount of 325 to 350 parts by weight. When the above-described range is satisfied, the weight-average molecular weight of an acrylonitrile-based copolymer for a carbon fiber is increased, and the molecular weight distribution thereof is decreased, and thus a carbon fiber having excellent mechanical properties can be manufactured. In addition, a spinning solution including an acrylonitrile-based copolymer for a carbon fiber has an appropriate viscosity, and thus a spinning process can be easily carried out.

Step 2): Polymerization

Subsequently, the reaction solution is subjected to polymerization.

The polymerization may be carried out in the presence of an initiator. The initiator may be one or more selected from the group consisting of azobisisobutyronitrile, 2,2'-azobis(4-methoxy-2,4-dimethylvaleronitrile), 2,2'-azobis(2,4-dimethylvaleronitrile), dimethyl 2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide], [(cyano-1-methylethyl)azo]formamide, 2,2'-azobis(N-butyl-2-methylpropionamide), and 2,2'-azobis (N-cyclohexyl-2-methylpropionamide), The initiator may preferably be one or more selected from the group consisting of azobisisobutyronitrile, dimethyl 2,2'-azobis(2-methylpropionate), and 2,2'-azobis(2-methylbutyronitrile).

The initiator may be added in an amount of 0.5 to 1.0 part by weight, 0.6 to 0.9 parts by weight, or 0.6 to 0.7 parts by weight, with respect to 100 parts by weight of the monomer mixture and is preferably added in an amount of 0.6 to 0.7 parts by weight. When the above-described condition is satisfied, a polymerization rate can be appropriately maintained, and thus a polymerization conversion rate relative to a reference time can be increased. In addition, an acrylonitrile-based copolymer for a carbon fiber which has a weight-average molecular weight suitable for a spinning process can be prepared.

The polymerization may be solution polymerization.

Meanwhile, the polymerization may include: primary polymerization of the reaction solution at a first temperature; and secondary polymerization of the reaction solution at a second temperature higher than the first temperature.

The first temperature may be 55 to 62° C. or 58 to 62° C. and preferably is 58 to 62° C. When the above-described condition is satisfied, a polymerization rate can be appropriately maintained, and thus a polymerization conversion rate relative to a reference time can be increased. In addition, an acrylonitrile-based copolymer for a carbon fiber which has a weight-average molecular weight suitable for a spinning process can be prepared.

The second temperature may be 65 to 72° C. or 68 to 72° C. and preferably is 68 to 72° C. When the above-described condition is satisfied, a polymerization rate can be appropriately maintained, and thus a polymerization conversion rate relative to a reference time can be increased. In addition, an acrylonitrile-based copolymer for a carbon fiber which has a weight-average molecular weight suitable for a spinning process can be prepared.

A ratio of the primary polymerization time and the secondary polymerization time may be 50:50 to 65:35 or 55:45 to 60:40 and is preferably 55:45 to 60:40. When the above-described condition is satisfied, a polymerization rate can be appropriately maintained, and thus a polymerization conversion rate relative to a reference time can be increased. In addition, an acrylonitrile-based copolymer for a carbon fiber which has a weight-average molecular weight suitable for a spinning process can be prepared.

After the secondary polymerization is completed, an acrylonitrile-based copolymer for a carbon fiber is obtained.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Example 1 to Example 8 and Comparative Example 1 to Comparative Example 8

100 parts by weight of monomer mixtures including sodium methallyl sulfonate (SMAS), itaconic acid (IA), and acrylonitrile (AN) in contents shown in Table 1 and Table 2 below were uniformly dissolved in dimethyl sulfoxide (DMSO) in contents shown in Table 1 and Table 2 to prepare reaction solutions.

Each of the reaction solutions was put into a reactor equipped with a stirrer, the inside of the reactor was filled with nitrogen, and then a temperature inside the reactor was raised to first temperatures shown in Table 1 and Table 2 at a rate of 10° C./h. Azobisisobutyronitrile (AIBN) was added in contents shown in Table 1 and Table 2, and primary solution polymerization was carried out for primary polymerization times shown in Table 1. Afterward, a temperature inside the reactor was raised to second temperatures shown in Table 1 and Table 2 at a rate of 10° C./h, and then secondary solution polymerization was carried out for secondary polymerization times shown in Table 1 and Table 2. After the secondary solution polymerization was completed, an acrylonitrile-based copolymer solution was obtained.

<Manufacture of Acrylonitrile-Based Fiber Precursor>

A temperature of the acrylonitrile-based copolymer solution (spinning solution) was raised to 50° C., and then the spinning solution was discharged into a coagulation tank (temperature: 60° C.) including a circulating solvent including water at 50 wt % and dimethyl sulfoxide at 50 wt % using a spinneret (diameter of hole: 65 μm, number of holes: 3,000) and coagulated to manufacture acrylonitrile-based coagulated yarn.

Subsequently, the acrylonitrile-based coagulated yarn was sequentially washed in a first washing tank (temperature: 60° C.), a second washing tank (temperature: 60° C.), a third washing tank (temperature: 70° C.), a fourth washing tank (temperature: 70° C.), a fifth washing tank (temperature: 80° C.), and a sixth washing tank (temperature: 80° C.). The coagulated yarn thus washed was hydrothermally stretched in first and second hot-water tanks (temperature: 95° C.) using a roller to manufacture first acrylonitrile-based stretched yarn. Then, the first acrylonitrile-based stretched yarn underwent an emulsion process and was dried at 110 to 140° C. to manufacture first acrylonitrile-based dry yarn. The first acrylonitrile-based dry yarn was stretched with steam to manufacture second acrylonitrile-based stretched yarn. Meanwhile, the second acrylonitrile-based stretched yarn had an elongation rate of 13. Subsequently, the second acrylonitrile-based stretched yarn was subjected to heat setting at 150 to 180° C. to manufacture an acrylonitrile-based fiber precursor.

<Manufacture of Acrylonitrile-Based Fiber>

The acrylonitrile-based fiber precursor was subjected to sequential fireproofing in a first oxidation furnace (temperature: 150° C.), a second oxidation furnace (temperature: 180° C.), a third oxidation furnace (temperature: 200° C.), and a fourth oxidation furnace (temperature: 230° C.) to manufacture an acrylonitrile-based fiber.

<Manufacture of Carbon Fiber>

The acrylonitrile-based fiber was carbonized in a first carbonization furnace, whose inside had been filled with nitrogen, for 15 minutes while raising a temperature from 400° C. to 1,600° C.

Experimental Example 1

Material properties of the acrylonitrile-based copolymer solutions of Examples and Comparative Examples were measured by methods described below, and results thereof are shown in Table 1 and Table 2.

(1) Polymerization conversion rate (%): 0.5 g of the acrylonitrile-based copolymer solution was coagulated while being immersed in water to manufacture a film, then the film was dried and weighed, and the resulting weight was compared with the weight percent of the copolymer determined upon polymerization to calculate a polymerization conversion rate.

(2) Weight-average molecular weight (g/mol) and molecular weight distribution (polydispersity index (PDI)): The weight-average molecular weight (Mw) and number-average molecular weight (Mn) of 1 g of the acrylonitrile-based copolymer solution were measured under the following conditions using gel permeation chromatography (GPC) to calculate a molecular weight distribution.

Column: PL mixed B×2, Solvent: DMF/0.05 M LiBr (0.45 μm Filtered), Flow rate: 1.0 ml/min, Concentration of sample: 4.0 mg/ml, Input amount: 100 μl, Column temperature: 65° C., Detector: Waters RI detector, Standard: PMMA)

(3) Viscosity (poise): measured by the following conditions using a Brookfield viscometer.

Spindle type: Cone type (CPA-52Z), Cone angle=3°, Cone radius=1.2 cm, Gap: 13 μm or less, Measurement shear rate: 10 to 20/sec, Measurement temperature: 45° C.

Experimental Example 2

A temperature at a flame retardant peak was measured during the manufacture of the acrylonitrile-based fibers of Examples and Comparative Examples, and results thereof are shown in Table 1 and Table 2.

Experimental Example 3

Material properties of the acrylonitrile-based fiber precursors of Examples and Comparative Examples were measured by methods described below, and results thereof are shown in Table 1 and Table 2.

(4) Circularity: measured using a scanning electron microscope (SEM) image analysis result.

○: Good, Δ: Fair, x: Poor (5) Strength (g/d): The strength of 25 single fibers was measured using a single filament tester (Favimat+ manufactured by Textechno), and an average value thereof was entered as a result.

Experimental Example 4

A material property of the carbon fibers of Examples and Comparative Examples was measured by a method described below, and results thereof are shown in Table 1 and Table 2.

(6) Strength (GPa): 100 parts by weight of YD-128 manufactured by Kukdo Chemical Co., Ltd. was mixed with 15 parts by weight of YDPN-638 manufactured by Kukdo Chemical Co., Ltd., 80 parts by weight of HR-160 manufactured by TCI, and 1 part by weight of HC-100 manufactured by TCI to manufacture a resin. A carbon fiber bundle was impregnated with the resin and cut into a length of 300 mm, and tabs were attached to both ends thereof using the resin to manufacture a strand specimen. In this case, an impregnation amount was adjusted so that an amount of the resin impregnated into the strand specimen was 40 wt %, and the specimen was designed to have a measurement length of 150 mm. The strength of the specimen was measured using a tensile strength tester (5982 manufactured by Instron). A measurement speed was set to 10 mm/min, and the measurement was repeated 7 times. The measurement of strength was carried out for 7 specimens, and an average value thereof was entered as a result.

TABLE 1

| Classification | | Examples | | | | |
|---|---|---|---|---|---|---|
| | | 1 | 2 | 3 | 4 | 5 |
| Monomer mixture (100 parts by weight) | SMAS (mol %) | 0.6 | 1.2 | 1.2 | 1.2 | — |
| | SAS (mol %) | — | — | — | — | 1.2 |
| | IA (mol %) | 1 | 1 | 1 | 1 | 1 |
| | AN (mol %) | 98.4 | 97.8 | 97.8 | 97.8 | 97.8 |
| DMSO (parts by weight) | | 342 | 342 | 342 | 318 | 342 |
| AIBN (parts by weight) | | 0.6 | 0.6 | 0.6 | 0.6 | 0.6 |
| First temperature (° C.) | | 60 | 60 | 60 | 60 | 60 |
| Primary polymerization time (h) | | 6 | 6 | 8 | 8 | 6 |
| Second temperature (° C.) | | 70 | 70 | 70 | 70 | 70 |
| Secondary polymerization time (h) | | 8 | 8 | 6 | 6 | 8 |
| Polymerization conversion rate | | 92 | 90 | 90 | 90 | 90 |
| Weight-average molecular weight | | 250,000 | 220,000 | 230,000 | 255,000 | 280,000 |
| Molecular weight distribution | | 2.3 | 2.2 | 1.9 | 2.1 | 2.4 |
| Viscosity | | 550 | 280 | 370 | 680 | 830 |
| Temperature at flame retardant peak (° C.) | | — | 282 | — | — | — |

TABLE 1-continued

| Classification | | Examples | | | | |
| --- | --- | --- | --- | --- | --- | --- |
| | | 1 | 2 | 3 | 4 | 5 |
| Acrylonitrile-based fiber precursor | Circularity | Δ | — | ○ | ○ | — |
| | Strength | 6.3 | — | 6.4 | 6.6 | — |
| Carbon fiber | Strength | 3.4 | — | 3.5 | 3.7 | — |

SMAS: Sodium methallyl sulfonate
SAS: Sodium allyl sulfonate
IA: Itaconic acid
AN: Acrylonitrile
DMSO: Dimethyl sulfoxide
AIBN: Azobisisobutyronitrile

TABLE 2

| Classification | | Comparative Examples | | | | |
| --- | --- | --- | --- | --- | --- | --- |
| | | 1 | 2 | 3 | 4 | 5 |
| Monomer mixture (100 parts by weight) | SMAS (mol %) | — | — | 0.6 | 1.2 | 1.8 |
| | IA (mol %) | 1 | 1 | — | — | — |
| | AN (mol %) | 99 | 99 | 99.4 | 98.8 | 98.2 |
| Reaction solvent (parts by weight) | DMSO | 342 | 294 | 342 | 342 | 342 |
| AIBN (parts by weight) | | 0.8 | 0.8 | 0.8 | 0.8 | 0.8 |
| First temperature (° C.) | | 65 | 60 | 65 | 65 | 65 |
| Primary polymerization time (h) | | 6 | 6 | 6 | 6 | 6 |
| Second temperature (° C.) | | 75 | 70 | 75 | 75 | 75 |
| Secondary polymerization time (h) | | 8 | 8 | 8 | 8 | 8 |
| Polymerization conversion rate | | 93 | 3 | 95 | 95 | 94 |
| Weight-average molecular weight | | 250,000 | 310,000 | 230,000 | 215,000 | 125,000 |
| Molecular weight distribution | | 2.5 | 2.9 | 2.6 | 2.5 | 2.3 |
| Viscosity | | 900 | 2,840 | 540 | 310 | 50 |
| Temperature at flame retardant peak (° C.) | | 281 | — | — | 288 | — |
| Acrylonitrile-based fiber precursor | Circularity | x | — | ○ | ○ | — |
| | Strength | 6.3 | — | 6.4 | 6.2 | — |
| Carbon fiber | Strength | 3.2 | — | 3.0 | 2.8 | — |

SMAS: Sodium methallyl sulfonate
IA: Itaconic acid
AN: Acrylonitrile
DMSO: Dimethyl sulfoxide
AIBN: Azobisisobutyronitrile Referring to Table 1 and Table 2, it can be predicted that the acrylonitrile-based copolymers of Example 1 to Example 5 will be manufactured as acrylonitrile-based fiber precursors and carbon fibers having excellent mechanical properties due to having an appropriate weight-average molecular weight and an appropriate molecular weight distribution. In addition, it can be predicted that the acrylonitrile-based copolymers will be more suitable for a spinning process due to having an appropriate viscosity.

As a result of comparing Example 1 and Example 2, it can be seen that the acrylonitrile-based copolymer of Example 2, which was prepared using a monomer mixture including sodium methallyl sulfonate at 1.2 mol %, exhibited a weight-average molecular weight, a molecular weight distribution, and a viscosity lower than those of the acrylonitrile-based copolymer of Example 1 which was prepared using a monomer mixture including sodium methallyl sulfonate at 0.6 mol %.

As a result of comparing Example 2 and Example 3, it can be seen that, although the total polymerization time was the same, the acrylonitrile-based copolymer of Example 2, in which a primary polymerization time was 6 hours, exhibited a low weight-average molecular weight, a high molecular weight distribution, and a low viscosity compared to the acrylonitrile-based copolymer of Example 3 in which a primary polymerization time was 8 hours. From this result, it can be seen that, when the total polymerization time is the same, as the primary polymerization time is longer, the material properties of the acrylonitrile-based copolymer are improved.

As a result of comparing Example 2 and Example 4, it can be seen that the acrylonitrile-based copolymer of Example 2, which was prepared using 342 parts by weight of dimethyl sulfoxide as a reaction solvent, exhibited a low weight-average molecular weight, a high molecular weight distribution, and a low viscosity compared to the acrylonitrile-based copolymer of Example 4 which was prepared using 318 parts by weight of dimethyl sulfoxide as a reaction solvent. From this result, it can be seen that, as a smaller amount of a reaction solvent is used, the material properties of the acrylonitrile-based copolymer are improved.

As a result of comparing Example 2 and Example 5, it can be seen that the acrylonitrile-based copolymer of Example 1, which was prepared using sodium methallyl sulfonate, exhibited a weight-average molecular weight, a molecular weight distribution, and a viscosity lower than those of the acrylonitrile-based copolymer of Example 2 which was prepared using sodium allyl sulfonate. From this result, it can be seen that sodium methallyl sulfonate serves to lower the weight-average molecular weight, molecular weight distribution, and viscosity of the acrylonitrile-based copolymer.

Meanwhile, it can be seen that the acrylonitrile-based copolymer solution of Comparative Example 1, which was prepared using a monomer mixture not including sodium methallyl sulfonate, was not suitable for use as a spinning solution due to excessively high viscosity, and the acrylonitrile-based fiber precursor made thereof exhibited poor circularity. In addition, as a result of comparing Comparative Example 1 and Example 1, it can be seen that, although the acrylonitrile-based copolymer of Comparative Example 1 had the same weight-average molecular weight as that of Example 1, the carbon fiber made thereof exhibited reduced strength. From this result, it can be seen that sodium methallyl sulfonate affects not only the circularity of an acrylonitrile-based copolymer but also the strength of a carbon fiber which is a final product.

As a result of comparing Comparative Example 1 and Comparative Example 2, it can be seen that the acrylonitrile-based polymer of Comparative Example 1, in which 342 parts by weight of dimethyl sulfoxide was used as a reaction solvent, exhibited a high weight-average molecular weight, a low molecular weight distribution, and a low viscosity compared to Comparative Example 2 in which 294 parts by weight of dimethyl sulfoxide was used as a reaction solvent. From this result, it can be seen that, as a smaller amount of a reaction solvent is used, the material properties of the acrylonitrile-based copolymer are improved. This result is very similar to the result of comparing Example 2 and Example 5.

As a result of comparing Comparative Example 3 to Comparative Example 5, it can be seen that, as a larger amount of sodium methallyl sulfonate was included in the monomer mixture, the weight-average molecular weight, molecular weight distribution, and viscosity of the acrylonitrile-based polymer were lowered. This result is very similar to the result of comparing Example 1 and Example 2.

The invention claimed is:

1. A method of preparing an acrylonitrile-based copolymer for a carbon fiber, the method comprising:
preparing a reaction solution including a monomer mixture and an organic solvent, wherein the monomer mixture comprises a sulfonate-based monomer represented by Chemical Formula 1, a carboxylic acid-based monomer, and an acrylonitrile-based monomer; and
subjecting the reaction solution to polymerization,
wherein the polymerization comprises:
primary polymerization of the reaction solution at a first temperature; and
secondary polymerization of the reaction solution at a second temperature higher than the first temperature,
wherein the monomer mixture comprises 0.55 to 1.6 mol % of the sulfonate-based monomer represented by Chemical Formula 1 based on a total molar amount of the monomer mixture:

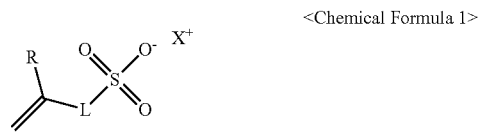

<Chemical Formula 1> wherein, in Chemical Formula 1,
R is hydrogen or a $C_1$ to $C_3$ linear alkyl group,
L is a $C_1$ to $C_3$ linear alkylene group, and
X is an alkali metal.

2. The method of claim 1, wherein the monomer mixture comprises the sulfonate-based monomer at 0.6 to 1.5 mol %, based on the total molar amount of the monomer mixture.

3. The method of claim 1, wherein the sulfonate-based monomer represented by Chemical Formula 1 is selected from the group consisting of sodium methallyl sulfonate and sodium allyl sulfonate.

4. The method of claim 1, wherein the monomer mixture comprises the carboxylic acid-based monomer at 0.5 to 1.5 mol %, based on the total molar amount of the monomer mixture.

5. The method of claim 1, wherein the first temperature is 55 to 62° C.

6. The method of claim 1, wherein the second temperature is 65 to 72° C.

7. The method of claim 1, wherein a ratio of a primary polymerization time and a secondary polymerization time is 50:50 to 65:35.

8. The method of claim 1, wherein the carboxylic acid-based monomer is one or more selected from the group consisting of acrylic acid, methacrylic acid, ethacrylic acid, itaconic acid, crotonic acid, citraconic acid, maleic acid, and mesaconic acid.

9. The method of claim 1, wherein the acrylonitrile-based monomer is one or more selected from the group consisting of acrylonitrile, methacrylonitrile, and ethacrylonitrile.

10. The method of claim 1, wherein the organic solvent is one or more selected from the group consisting of dimethyl sulfoxide, dimethyl formamide, and dimethyl acetamide.

* * * * *